United States Patent [19]

Krautkrämer

[11] Patent Number: 4,702,463
[45] Date of Patent: Oct. 27, 1987

[54] GAS SPRING

[76] Inventor: Hermann Krautkrämer, Bachstrasse 11, 5401 Bassenheim, Fed. Rep. of Germany

[21] Appl. No.: 750,014

[22] Filed: Jun. 27, 1985

[30] Foreign Application Priority Data

Jul. 31, 1984 [DE] Fed. Rep. of Germany ....... 3428188
Mar. 29, 1985 [DE] Fed. Rep. of Germany ....... 3511554

[51] Int. Cl.$^4$ ............................................. F16F 5/00
[52] U.S. Cl. ........................... 267/64.26; 188/322.13;
188/322.17; 188/322.19; 188/322.21;
267/64.28; 267/140
[58] Field of Search ................. 267/35, 64.11, 64.14,
267/64.15, 64.18, 64.22, 64.25, 64.26, 64.28,
120, 121, 129, 140; 188/322.13, 322.16, 322.19,
322.21, 270, 283, 286, 284, 322.17, 322.18;
137/843; 251/77, 320, 324

[56] References Cited

U.S. PATENT DOCUMENTS

| 193,694 | 7/1877 | Dick | 267/64.15 |
|---|---|---|---|
| 1,718,323 | 6/1929 | Wallace | 267/64.11 |
| 2,379,388 | 6/1945 | Thornhill | 267/64.15 |
| 2,554,581 | 5/1951 | Levy | 267/64.25 X |
| 2,599,477 | 6/1952 | Patriquin | 188/284 |
| 3,188,072 | 6/1965 | Wüstenhagen et al. | 267/64.25 |
| 3,379,430 | 4/1968 | Hennells | 267/64.25 |
| 3,560,267 | 2/1971 | Guilliams | 137/843 X |
| 4,438,909 | 3/1984 | Matsumoto | 267/64.26 |

FOREIGN PATENT DOCUMENTS 1208951  1/1966  Fed. Rep. of Germany.
2457938  6/1976  Fed. Rep. of Germany.

Primary Examiner—George E. A. Halvosa
Attorney, Agent, or Firm—Michael J. Striker

[57] ABSTRACT

A gas spring for damping structural components, for example of a car, comprises two cylinders filled with gas, of which one cylinder is provided with a first piston and is movable in the other cylinder. The other cylinder has a piston rod extended centrally thereof and passing through the first piston. The piston rod carries at the free end thereof a second piston movable within the first cylinder.

23 Claims, 5 Drawing Figures

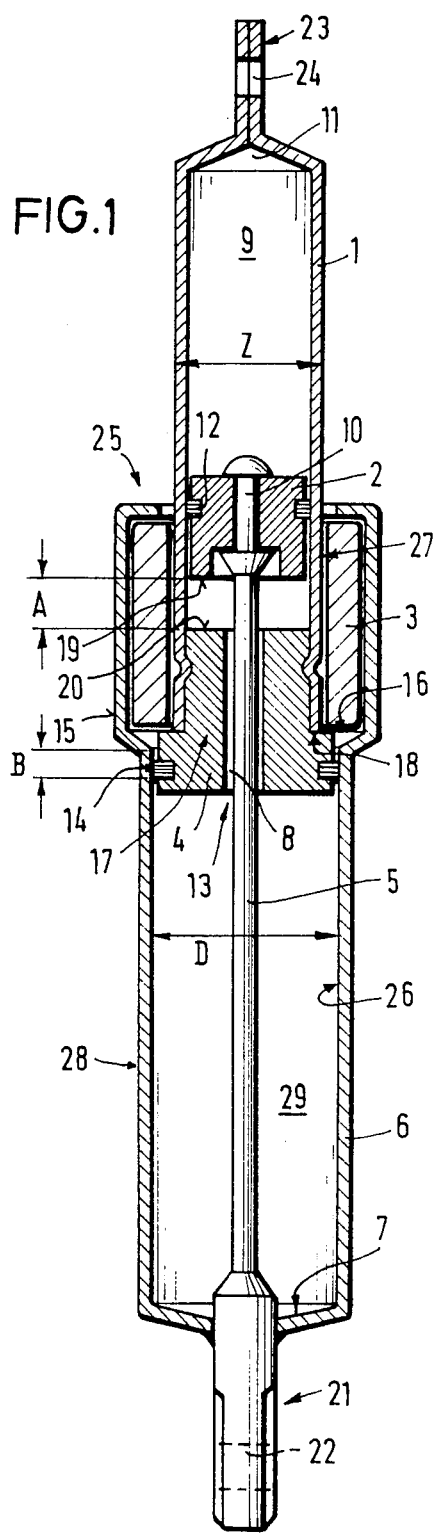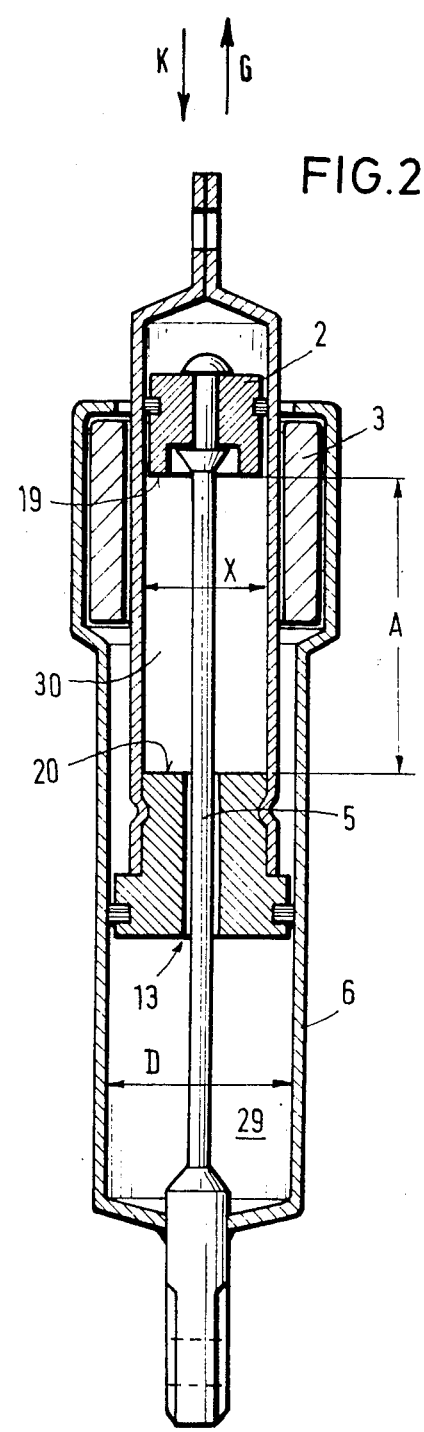

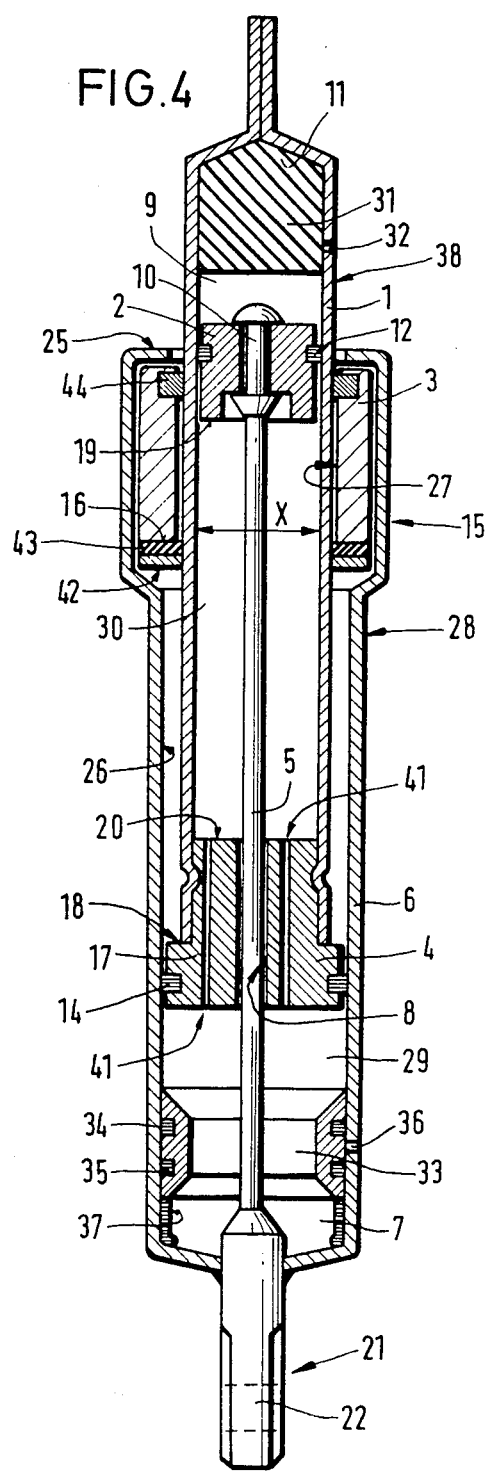

GAS SPRING

BACKGROUND OF THE INVENTION

The present invention relates to a gas spring of the type including a cylinder filled with gas and in which a piston, provided with a piston rod, is guided.

Gas springs of the foregoing type are utilized, for example in motor vehicles and are usually arranged on engine flaps, trunks, covers or engine cowlings wherein the gas springs facilitate weight compensation and also exert onto the structural components a damping action during the shutting of those components.

The progression of a spring force of the gas spring should be adjusted by a multiple loading of the pressure chambers of the spring with a more or less compressed gas to respective operational ratios. For example, as disclosed, in DE-AS1,208,951, col. 1, lines 38–40, a filling pressure of the pressure chamber of the spring is more than 70 atu.

The disadvantage of such gas springs resides in that, for example during a traffic accident the structural components of the gas springs can slip out from the car elements and seriously injure people involved in the accident.

It has been suggested to avoid such a danger to provide the gas springs with safety limits which would ensure that in case of a forceful action or overloads the gas cushions remaining under high pressure could harmlessly escape from the springs.

The safety arrangements in gas springs suggested up to now offer some warrenty for avoiding great danger in cases of failure or accidents. On the other hand these safety arrangements included groove-shaped notches in the outer regions of the piston rods and pressure cylinders which could not be precisely defined. It is known that such notches can cause fatigue breaks in metallic components and the damage can not be practically appraised. The arrangement of breaking points or notches has required a great deal of precision during the manufacture, and finally a force causing breaks under corresponding various operational conditions is not calculable. Furthermore with the provision of breaking points on the elements of the gas springs a certain unsafety still remains so that the problems which could occur in case of a traffic accident have not yet been solved with the known arrangements.

SUMMARY OF THE DISCLOSURE

It is an object of the present invention to provide a improved gas spring.

It is another object of this invention to provide a gas spring in which accidental slipping of the spring components out of the assembly would be prevented even in case of overloading or the influence of an external force.

It is yet another object of this invention to provide a gas spring which is easy to manufacture and assemble and which is durable in operation and ensures a progressive damping effect.

These and other objects of the invention are attained by a gas spring comprising a first cylinder filled with a gaseous medium and being closed at a bottom wall thereof; a second cylinder closed at a bottom wall and movable in said first cylinder in an axial direction thereof upon applying an external force to said second cylinder; a guide ring seal guiding said second cylinder in said first cylinder upon the movement thereof; said second cylinder having an inner chamber, a front side opening and being provided with a first piston connected to said second cylinder at said opening, said first piston being axially displaceable in said first cylinder; said first cylinder including a piston rod centrally positioned therein and rigidly connected to the bottom wall of said first cylinder, said first piston having a bore receiving therethrough said piston rod which has a free end extended into said inner chamber, said piston rod carrying at said free end a second piston which is axially movably guided in said second cylinder, whereby the gas spring develops a pressure force in the direction counter to the action of said external force.

The advantage of the gas spring of the invention resides in that it provides a great degree of safety in case of overloading or an accident as well as a satisfactory speed of a progressive damping action and is simple in construction at the same time.

The first piston may be formed as a damping piston, said bore defining with said piston rod passing therethrough a ring-shaped gap which acts as a gas throttle.

The piston rod may be positioned in said bore with a free fit, said first at least one bore extended in said axial direction and acting as a gas throttle.

An outer diameter of said first piston may be substantially greater than the outer diameter of said second cylinder.

The outer diameter of said first piston may be by about 20% greater than the outer diameter of said second cylinder.

The first piston and the second piston may be each provided with a guiding seal which guides a respective piston in a respective cylinder.

The first cylinder may have a portion of enlarged diameter, said portion having a flange, said guide ring seal being positioned in said portion and being rigidly anchored with said flange.

The guide ring seal may have, at an end thereof facing said flange, a ring-shaped sealing element which abuts against an outer wall of said second cylinder.

The guide ring seal may have an annular end face facing away from said flange and projecting radially inwardly beyond an inner wall of said first cylinder, said first piston having at said opening of said second cylinder an end surface projecting radially outwardly towards said inner wall, said annular end face cooperating with said end surface to form end stops of said first and second cylinders.

Said end face may be provided with a buffler packet which is comprised of an abutment ring of metal and an intermediate ring of elastic material.

The first piston and the second piston have end faces opposing each other and being axially spaced from each other by a first predetermined distance in which said end stops define an end position of the spring in a noncompressed condition.

The guiding seal of said first piston may be spaced from an end of said enlarged portion, facing away from said flange, by a second predetermined distance in said end position.

Said second predetermined distance may be smaller than said first predetermined distance in said end position.

The spring may further include a compressible elastic member of elastic material acting as an overpressure valve and positioned in said second cylinder at the bottom wall thereof. The elastic member is formed as a spring restoring element.

The elastic member may be formed of rubber or plastics.

The second cylinder may be formed in the region of said elastic member with a pressure-unloading radial bore; said radial bore being overlapped and gas-tightly closed by said elastic member in a non-compressed position of said elastic member.

The spring may further include a stop ring for said first piston, said stop ring being positioned in said first cylinder, and a ring-shaped supporting element mounted at the bottom wall of said first cylinder for supporting said stop ring in spaced relationship from said bottom wall.

The stop ring may be provided with two annular seals axially spaced from each other and tightly abutting against an inner surface of said first cylinder.

The first cylinder may have a pressure-unloading radial bore positioned axially between said seals at such a distance from the bottom wall of said first cylinder that it is gas-tightly closed by said stop ring in an unchanged position of said ring.

The piston rod may have an end portion extended outwardly from said first cylinder, said end portion having a connection eyelet therein.

The second cylinder may have a projection extending outwardly from the bottom wall thereof sand provided with a connection eyelet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a sectional view through a gas spring of the invention in an inoperative position;

FIG. 2 is a sectional view of the gas spring of FIG. 1 in a loaded, compressed position;

FIG. 4 is a sectional view of another modified embodiment of the gas springs with an additional seal and a stop pad in the region of a guide ring seal.

DETAILED DESCRIPTION OF THE PREFERRED EMBODIMENTS

Figure 3:
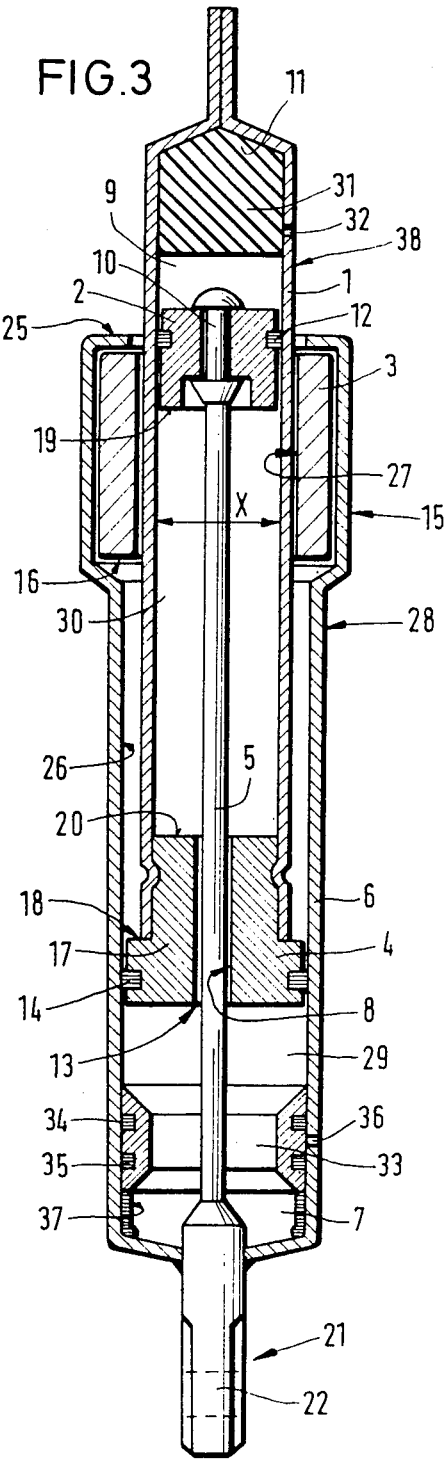
FIG. 3 is a sectional view of the gas spring with additional safety arrangements.

Referring now to the drawings in detail, and firstly to FIGS. 1 and 2 thereof, the gas spring is comprised of a first cylinder 6 which is closed at its bottom wall 7. A second cylinder 1 which is closed at its bottom wall 11 is axially movably guided in the first cylinder 6 by means of a guide ring seal 3. The second cylinder 1 positioned axially opposite to cylinder 6 has a front opening 17 at which a first piston 4 is located. This first piston 4 is connected to second cylinder 1 at its front side opening 17. Piston 4 is axially guided in the first cylinder 6. An elongated piston rod 5 which is centrally positioned in the interior of cylinder 6 is rigidly connected to the bottom wall 7. Piston rod 5 extends through a bore 8 in the first piston 4 into an inner chamber 9 of the second cylinder 1. Piston rod 5 carries at its free end 10 a second piston 2 which is axially displaceable in the second cylinder 1.

First piston 4 is formed as a damping piston in which bore 8 has a diameter greater than that of piston rod 5 whereby a circular gap 13 is formed which constitutes a gas throttle. The first piston 4 in the exemplified embodiment has an outer diameter "D" which is substantially greater than the outer diameter "Z" of the second cylinder 1. The diameter difference amounts, for example to approximately 20%. Pistons 2 and 4 are medium-tight guided by means of seals 12 and 14, respectively, in cylinders 1 and 6.

An arrangement of the guide ring seal 3 is also an important feature of this invention. Guide ring seal 3 is formed with a relatively-long-in the axial direction guide bore 27 which ensures a reliable coaxial guidance of cylinders 1 and 6 one within the other. This guide ring seal 3 is positioned in a cylindrical wall portion 15 of greater diameter than that of the remaining wall part 28 of cylinder 6. Guide ring seal 3 is rigidly anchored in a flange 25 formed by the wall portion 15. Thereby the aforementioned difference between diameter "D" and diameter "Z" results, and an annular front-side wall surface 16 of the guide ring seal 3, extended radially inwardly from the surface 26 of cylinder 6, and an end surface 18 of the first piston 4, extended radially outwardly from the first-side opening 17, cooperate with each other as end stops or abutments of the both cylinders.

In case of a forceful tension load, for example in case of a traffic accident and high deceleration forces caused thereby or a crushing of a trunk cover the gas spring first takes its end position with the aid of the very stable end abutments or stops 16, 18.

Pistons 2 and 4 have end faces 19 and 20 opposing each other and spaced from each other by an axial distance "A" in the end position of the spring. A seal 14 of the first piston 4 is in this end position axially spaced by a distance "B" from the lower end of the enlarged wall portion 15.

If due to the above mentioned forceful action a holding force of the first limit or end stops is overcharged, for example by the destruction of the flange 25, the gas spring according to the invention can take a second end or limiting position in which end faces 19 and 20 of pistons 2 and 4 come into abutment with each other. A further safety is ensured by the fact that the axial distance "A" is greater than the axial distance "B". It is thereby ensured that, upon reaching of the second end or limiting stop position, the seal 14 enters the region of the enlarged wall portion 15 of cylinder 6, whereby the sealing action is interrupted and pressure gas found in a pressure chamber 29 of the first cylinder 6 can safely escape. Thus in an extreme case the piston rod 5, which is rigidly connected with the second piston 2 and is rigidly anchored at the inner side to the bottom wall 7 of the first cylinder 6, operates as a pull rod which prevents an explosive-like movement of two cylinders one from another and thereby substantially increases a function safety of the gas spring. For the case in which, due to the aforementioned forceful action, for example in the case of an accident, the gas spring must be compressed beyond its end position, further safety arrangements are provided, which act to reduce dangerously increased compression energy of a gas filler without any harm.

These additional safety arrangements will be described with reference to FIGS. 3 and 3a. In the interior of the second cylinder 1 in the region of its bottom wall 11, a compressible shaped element 31 of elastic material is positioned, which operates as a stop or abutment pad or buffler. This elastic element 31 is formed as a resilient restoring spring element which may be made of rubber or other elastic material. A pressure-unloading bore 32 in a wall 38 of the second cylinder 1 in the non-compressed condition, shown in FIG. 3, extends beyond elastic element 31 and is gas-tightly by connected therewith.

Figure 3A:
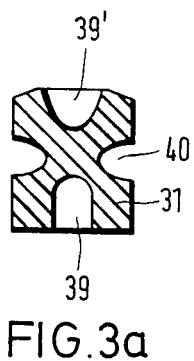
FIG. 3a is a sectional view of a stop pad of elastic material.

The cross-section of the elastic element 31 formed of rubber or, other elastic material and operated as a spring restoring member is shown in FIG. 3a. The elastic material or rubber utilized for this elastic element has, for example the hardness of 60° on the Shore Scale. Since rubber or plastics utilized herein are material-imcompressible the flexibility of the elastic element 31 is obtained by the construction of this as a spring restoring member which is provided with opposing recesses 39, 39' and opposing rooves 40 and acts as a rubber spring. Elastic element 31 may be manufactured of a material having gas inclusions.

An additional safety against super high pressure peaks is ensured in the pressure chamber 29 of cylinder 6 by means of a ring 33 acting as a stop for piston 4 and arranged in the region of the closed bottom wall 7 of cylinder 6. Ring 33 is supported and spaced from the bottom wall 7 by an annular supporting element 37. Ring 33 is further provided with two seals 34 and 35 spaced from each other in the axial direction and tightly abutting against the inner face 26 of cylinder 6.

An unloading bore 36, radially extended in the wall 28 of cylinder 6, is formed between seals 34 and 35 at such a distance from the bottom wall 7 that this bore is gas-tight closed when the position of ring 33 is unchanged.

The above described additional safety arrangements operate during the forceful compression of the gas springs so that on the one hand, a pressure peak built-up in the inner chamber 9 of the second cylinder 1 compresses the elastic element 31 whereby gas can escape from pressure chamber 9 through bore 32. On the other hand, a similar forceful compression process causes the first piston 4 to abut against ring 33 and displace the latter, under the deformation of supporting element 37 towards the bottom wall 7 of the first cylinder 6. Thereby the unloading bore 36 is moved away from the region of the both seals 34 and 35 of ring 33 and a dangerously high gas pressure can be eventually released from the pressure chamber 29.

The safety arrangements of this invention, particularly additional safety elements offer a high degree of safety in case of a forceful effect by the above described compressing or pulling.

The mode of operation of the gas spring of FIGS. 1 and 2 is as follows:

In an non-compressed position according to FIG. 1 a given gas pressure prevails in the cylinder chamber 29 of the first cylinder 6 and the cylinder chamber 9 of the second cylinder. This given gas pressure defines a spring constant of the gas spring. Such a pressure may be, for example between 1 bar and 50 bar. The gas spring is hinged at two connection eyes 22 and 24 between two kinematically movable joints (not shown) for the exertion of a restoring force. Upon the application of the load to the gas spring the latter is compressed by an external force "K" exceeding the force of the spring, in the axial direction whereby the spring takes the position shown in FIG. 2. Thereby first piston 4 slides along the peripheral surface 26 of the first cylinder 26 towards the bottom wall 7 into the first cylinder 6 and displaces a volume portion of the gas filler. Upon the increase of the pressure a portion of such displaced gas filler escapes via throttle gap 13 into a chamber 30 which is formed between two opposing end faces 19 and 20 of pistons 2 and 4 and which increases with the movement of the first and second pistons 4 and 2. Distance "A" between end faces 19 and 20 is correspondingly increased. Due to the difference between the inner diameter "D" of the first cylinder 6 and the inner diameter "X" of the second cylinder 1, this results, with a progressive compression of the gas spring, in a progressive reduction of the whole volume of both inner chambers 29 and 30 and thereby in the increase of a working pressure of a gaseous pressure medium in these two chambers.

Simultaneously the gas chamber 9 of the second cylinder 1 is reduced and thus the working pressure of the pressure gas contained therein is respectively increased. Accordingly, a counter force "G" which the spring exerts against the external force "K", increases.

Upon the ceasing of the application of force "K" the gas spring tends to return to its unloaded position. Thus the cylinder 1 moves in the backward direction while the distance "A" is reduced. The gas chamber 30 between the piston end faces 19 and 20 is decreased and gas is displaced from this chamber. In order to flow into the enlarged gas chamber 29 the dislodged gas flows from chamber 30 through the throttle gap 13 in the backward direction and causes thereby, particularly at the end phase of the movement, a progressive damping of the movement of both cylinders 1 and 6, one away from the other.

In the embodiment shown in FIG. 4, in addition to the above-described elastic element 31 and ring 33 supported by element 37 of FIG. 3, a ring-shaped seal element 44 is provided in the guide ring seal 3 in the region of flange 25. Seal element 44 abuts against the outer wall of cylinder 1 and operates to prevent, the penetration of moisture and/or contamination particles into the annular space between the inner wall of cylinder 6 and outer wall of cylinder 1. It is important to prevent the formation of condensate in this space, which can cause blocking of the gas spring at minus temperatures.

In place of the throttle gap 13 a free fit is provided between the bore 8 of piston 4 and piston rod 5 in the embodiment of FIG. 4. Piston 4 is formed with at least one throttle bore 41 and operates as a damping piston. The advantage of such a structure resides in that a better guide of the portions 5 and 8 slding one within the other is provided, which leads to a precise adjustability of a throttling or damping operation.

Finally, in the modified embodiment of FIG. 4 the end-side wall surface 16 of the guide ring seal 3 has a buffler packet comprised of a preferably metallic stop ring 42 and an intermediate ring 43 made preferably of elastic material. In case of a relatively hard end stop impact the impact forces acting on the piston surface 18 or the end stop surface 16 will be reduced whereby again a better safety against a forceful damage would be ensured.

The gas spring according to the present invention is easy to manufacture and very satisfactory in use. The function of the gas spring is surprisingly reliable. The spring ensures a great degree of safety, particularly at the end of the pulling movement.

It will be understood that each of the elements described above, or two or more together, may also find a useful application in other types of gas springs differing from the types described above.

While the invention has been illustrated and described as embodied in a gas spring, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gas spring comprising a first cylinder filled with a gaseous medium and being closed at a bottom wall thereof; a second cylinder closed at a bottom wall and movable in said first cylinder in an axial direction thereof upon applying an external force to said second cylinder; a guide ring seal guiding said second cylinder in said first cylinder upon the movement thereof; said second cylinder having an inner chamber and a front side opening and being provided with a first piston connected to said second cylinder at said opening, said first piston being axially displaceable in said first cylinder; said first cylinder including a piston rod centrally positioned therein, said piston rod having a free end carrying a second piston which is axially movably guided in said second cylinder, whereby the gas spring develops a pressure force in the direction counter to the action of said external force, wherein said first piston is formed as a damping piston, said first cylinder having a portion with a smaller inner diameter and a portion with a greater inner diameter; and a sealing member arranged between said first piston and said portion with a smaller inner diameter in a normal condition, so that in the case of an emergency and an increased pressure of a gaseous medium in said portion with a smaller diameter of said first cylinder, said first piston together with said sealing member is displaced by the increased pressure into said portion with a greater diameter and therefore a gaseous medium can safely escape through a gap which is thusly formed between said sealing member and said portion with a greater diameter of said first cylinder.

2. The spring as defined in claim 1, wherein said first piston and said second piston are each provided with a sealing member which gas tightly seals a respective piston in a respective cylinder, said first piston and said second piston having end faces opposing each other and being axially spaced from each other by a first predetermined distance "A" when said end faces define an end position of the spring in a non-compressed condition, the sealing member of said first piston being spaced from an end of said enlarged diameter portion by a second predetermined distance "B" in said end position, said second predetermined distance being smaller than said first predetermined distance.

3. The spring as defined in claim 2, said first cylinder having a portion of enlarged diameter, said enlarged diameter portion having a flange, said guide ring seal being positioned in said enlarged diameter portion and being rigidly anchored with said flange.

4. The spring as defined in claim 2, wherein said guide ring seal has an annular end face facing away from said flange and projecting radially inwardly beyond an inner wall of said first cylinder, said first piston having at said opening of said second cylinder an end surface projecting radially outwardly towards said inner wall; said annular end face cooperating with said end surface to form end stops of said first and second cylinders.

5. The spring as defined in claim 4, wherein said first piston and said second piston have end faces opposing each other and being axially spaced from each other by a first predetermined distance A in which said end faces define an end position of the spring in a non-compressed condition.

6. The spring as defined in claim 5, wherein the sealing member of said first piston is spaced from an end of said enlarged portion, facing away from said flange, by a second predetermined distance B in said end position.

7. The spring as defined in claim 6, wherein said second predetermined distance B is smaller than said first predetermined distance A in said end position.

8. The spring as defined in claim 1, wherein said guide ring seal has, at an end thereof facing said portion with a greater inner diameter, a ring-shaped sealing element which abuts against an outer wall of said second cylinder.

9. The spring as defined in claim 1, further including a compressible elastic member of elastic material acting as an overpressure valve and positioned in said second cylinder at the bottom wall thereof.

10. The spring as defined in claim 9, wherein said elastic member is formed as a spring restoring element.

11. The spring as defined in claim 10, wherein said elastic member is formed of rubber.

12. The spring as defined in claim 10, wherein said elastic member is formed of plastics.

13. The spring as defined in claim 9, wherein said second cylinder is formed in the region of said elastic member with a pressure-unloading radial bore; said radial bore being overlapped and gas-tightly closed by said elastic member in a non-compressed position of said elastic member.

14. The spring as defined in claim 1, wherein said piston rod has an end portion extended outwardly from said first cylinder, said end portion having a connection eyelet therein.

15. The spring as defined in claim 14, wherein said second cylinder has a projection extending outwardly from the bottom wall thereof and provided with a connection eyelet.

16. The spring as defined in claim 1, wherein said bore of said first piston, which receives therethrough said piston rod, defines with said piston rod passing therethrough a ring-shaped gap which acts as a gap throttle.

17. The spring as defined in claim 1, wherein an outer diameter of said first piston is substantially greater than an outer diameter of said second cylinder.

18. The spring as defined in claim 17, wherein the outer diameter of said first piston is by about 20% greater than the outer diameter of said second cylinder.

19. The gas spring as defined in claim 1, wherein first cylinder has a portion of an enlarged diameter with a flange, said guide ring seal being positioned in said portion and having an annular end face facing away from said flange and projecting radially inwardly beyond an inner wall of said first cylinder, said annular end face being provided with a buffer packet, said first piston having at said opening of said second cylinder an end surface projecting radially outwardly toward said inner wall and cooperating with said buffer packet of said annular end face of said guiding ring seal so as to form end stops of said first and second cylinders.

20. A gas spring comprising a first cylinder filled with a gaseous medium and being closed at a bottom wall thereof; a second cylinder closed at a bottom wall and movable in said first cylinder in an axial direction thereof upon applying an external force to said second cylinder; a guide ring seal guiding said second cylinder in said first cylinder upon the movement thereof; said second cylinder having an inner chamber and a front side opening and being provided with a first piston connected to said second cylinder at said opening, said first piston being axially displaceable in said first cylinder; said first cylinder including a piston rod centrally positioned therein and rigidly connected to the bottom wall of said first cylinder, said first piston having a bore receiving therethrough said piston rod which has a free end extended into said inner chamber, said piston rod carrying at said free end a second piston which is axially movably guided in said second cylinder, whereby the gas spring develops a pressure force in the direction counter to the action of said external force, said first piston and said second piston being each provided with a sealing member which gas tightly seals a respective piston in a respective cylinder, said first cylinder having a portion of enlarged diameter, said portion having a flange, said guide ring seal being positioned in said portion and being rigidly anchored with said flange, said guide ring seal having an annular end face facing away from said flange and projecting radially inwardly beyond an inner wall of said first cylinder, said first piston having at said opening of said second cylinder an end surface projecting radially outwardly towards said inner wall, said annular end face cooperating with said end surface to form end stops of said first and second cylinders, said annular end face being provided with a buffer package which is comprised of an abutment ring of metal and an intermediate ring of elastic material.

21. A gas spring comprising a first cylinder filled with a gaseous medium and being closed at a bottom wall thereof; a second cylinder closed at a bottom wall and movable in said first cylinder in an axial direction thereof upon applying an external force to said second cylinder; a guide ring seal guiding said second cylinder in said first cylinder upon the movement thereof; said second cylinder having an inner chamber and a front side opening and being provided with a first piston connected to said second cylinder at said opening, said first piston being axially displaceable in said first cylinder, said first cylinder including a piston rod centrally positioned therein and rigidly connected to the bottom wall of said first cylinder, said first piston having a bore receiving therethrough said piston which has a free end extended into said inner chamber, said piston rod carrying at said free end a second piston which is axially movably guided in said second cylinder, whereby the gas spring develops a pressure force in the direction counter to the action of said external force; a stop ring for said first piston, said stop ring being positioned in said first cylinder; a ring-shaped supporting element mounted at the bottom wall of said first cylinder for supporting said stop ring in spaced relationship from said bottom wall, said first cylinder having a pressure-unloading bore positioned at such a distance from the bottom wall of said first cylinder that said bore is gas-tightly closed by said stop ring in an unchanged position of said ring.

22. The spring as defined in claim 21, wherein said stop ring is provided with two annular seals axially spaced from each other and tightly abutting against an inner surface of said first cylinder.

23. A gas spring comprising a first cylinder filled with a gaseous medium and being closed at a bottom wall thereof; a second cylinder closed at a bottom wall and movable in said first cylinder in an axial direction thereof upon applying an external force to said second cylinder; a guide ring seal guiding said second cylinder in said first cylinder upon the movement thereof; said second cylinder having an inner chamber and a front side opening and being provided with a first piston connected to said second cylinder at said opening, said first piston being axially displaceable in said first cylinder; said first cylinder including a piston rod centrally positioned therein and rigidly connected to the bottom wall of said first cylinder, said first piston having a bore receiving therethrough said piston rod which has a free end extended into said inner chamber, said piston rod carrying at said free end a second piston which is axially movably guided in said second cylinder, whereby the gas spring develops a pressure force in the direction counter to the action of said external force; a stop ring for said first piston, said stop ring being positioned in said first cylinder; a ring-sealed supporting element mounted at the bottom wall of said first cylinder for supporting said stop ring in spaced relationship from said bottom wall, said stop ring being provided with two annular seals axially spaced from each other and tightly abutting against an inner surface of said first cylinder, said first cylinder having a pressure-unloading radial bore positioned axially between said two annular seals at such a distance from the bottom wall of said first cylinder that said bore is gas-tightly closed by said stop ring in an unchanged position of said ring.

* * * * *